United States Patent [19]

Asai

[11] Patent Number: 4,802,076
[45] Date of Patent: Jan. 31, 1989

[54] SWITCHING REGULATOR TYPE POWER SUPPLY CIRCUIT

[75] Inventor: Shunji Asai, Yao, Japan

[73] Assignee: Sanyo Electric Co., Ltd., Osaka, Japan

[21] Appl. No.: 92,820

[22] Filed: Sep. 3, 1987

[30] Foreign Application Priority Data

Sep. 12, 1986 [JP] Japan ................. 61-216517

[51] Int. Cl.$^4$ ........................................ H02M 3/335
[52] U.S. Cl. ........................................ 363/19; 363/97; 363/131
[58] Field of Search .................. 363/20, 21, 97, 131, 363/56, 19, 18

[56] References Cited

U.S. PATENT DOCUMENTS

| | | | |
|---|---|---|---|
| 4,327,404 | 4/1982 | Horiguchi | 363/97 X |
| 4,488,210 | 12/1984 | Shono | 363/97 X |
| 4,649,464 | 3/1987 | Shono | 363/97 X |
| 4,654,772 | 3/1987 | Thorne | 363/97 X |

FOREIGN PATENT DOCUMENTS 59-2570 1/1984 Japan.

Primary Examiner—Patrick R. Salce
Assistant Examiner—Kristine L. Peckman
Attorney, Agent, or Firm—Armstrong, Nikaido, Marmelstein & Kubovcik

[57] ABSTRACT

A switching regulator type power supply circuit comprises a converter transformer, a blocking oscillation circuit comprising a transistor having a collector connected to a rectifying output of an AC power supply through the input winding of the transformer and an emitter and a base connected to a positive feedback winding of the transformer, and a switching control circuit connected between the base of the transistor and a fluctuation detecting winding and the positive feedback winding of the converter transformer. Still another switching transistor is connected between the base of the switching transistor and the positive feedback winding and a proportional current supply circuit comprising a coil and a Zener diode is connected to the emitter and the base, the base having a resistor for bias connected thereto. As a result, when a fluctuation of the input voltage applied to the input winding or a fluctuation of a load connected to the output winding occurs, a base current in accordance with the fluctuation of the collector current is supplied to transistor for blocking oscillation.

10 Claims, 4 Drawing Sheets

SWITCHING REGULATOR TYPE POWER SUPPLY CIRCUIT

BACKGROUND OF THE INVENTION

1. Field of the Invention

The present invention relates to a switching regulator type power supply circuit and, more particularly, to a switching regulator type power supply circuit using a blocking oscillation circuit.

2. Description of the Prior Art

A switching regulator type power supply circuit is classified into various types and one of them is a type in which blocking oscillation is performed by a switching transistor and a converter transformer. One of power supply circuits of this type as shown in FIG. 1 is disclosed in Japanese Patent Laying-Open No. 2570/1984.

The power suply circuit shown in FIG. 1 comprises an input rectifying portion 1, a blocking oscillation portion 2, a converter transformer 3, a fluctuation detecting portion 4, a control portion 5, an output rectifying portion 6 and a feedback current control circuit 7 only the portion relating to the present invention is described hereinafter.

The conventional example shown in FIG. 1 performs a blocking oscillation, when a switching transistor TR4 is on, by letting a positive feedback current If flow from the side of a terminal e of a feedback winding N3 of the converter transformer 3 to the base of the transistor TR4 through a path shown in the figure. The feedback current control circuit 7 comprising a constant-current circuit CA in the current path is provided to cause the positive feedback current If to be a constant current in a steady state. A more detailed description is made in this respect. Since a Zener diode D10 and resistors R16–R18 are selected such that a transistor TR5 in the circuit 7 may be turned on by the voltage between the terminals c and e of the feedback winding N3 while the switching transistor TR4 is on and the resistor R12 is set sufficiently larger than the resistor R17, the above mentioned positive feedback current If flows mainly through the transistor TR5, and the current becomes a constant current due to $If=(V_Z-V_{BE})/R17$ where $V_{BE}$ is the voltage between the base and the emitter of the transistor TR5 and $V_Z$ is the Zener voltage of the Zener diode D10.

The above positive feedback current If is caused to be a constant current for the following reason. Assuming that the feedback current control circuit 7 is not a constant-current circuit but a constant-impedance, the positive feedback current If in this case is proportional to the voltage between the terminals c and e of the feedback winding N3 and that voltage is proportional to an input voltage applied to an input winding N1. As a result, the more the input voltage applied to the input winding N1 is decreased, the more the current If is decreased. Meanwhile, referring to FIG. 1, when the input voltage applied to the input winding N1 is decreased or a load connected to an output winding N2 is increased, an "on period" of the switching transistor TR4 is controlled to be long, so that a collector current Ii of the TR4 is increased at that time. Therefore, in that case, the base positive feedback current If large enough to allow a flow of the collector current Ii of a big peak value can not be supplied and the switching transistor TR4 is not driven, with the result that a predetermined DC output voltage can not be provided from the output winding N2. Thus, to avoid such a defect, the positive feedback current If is made to be a constant current.

However, in a conventional circuit shown in FIG. 1, if the current value has been set to be a relatively high value so as to supply enough positive feedback current If when the input voltage applied to the input winding N1 is low or the load connected to the output winding N2 is increased, the switching transistor TR4 is in an overdrive state when the input voltage applied to the input winding N1 is high or the load connected to the output winding N2 is decreased, with the result that a stabilized control range becomes small due any increase in the power loss of the switching transistor TR4. In addition, when the input voltage applied to the input winding N1 is high, the voltage of the feedback winding is also high as mentioned above, so that power consumption in the transistor TR5 is also increased.

Meanwhile, although the positive feedback current If is always kept at a constant value while the switching transistor TR4 is on, the collector current Ii is increased linearly as time passes while the switching transistor TR4 is on and, as a result, the above current If can not be a value providing an optimum drive always during the above mentioned on period. Therefore, there is also another disadvantage that the power loss of the switching transistor TR4 is originally high without regard to the state of the input voltage applied to the input winding N1 and the load connected to the output winding N2.

SUMMARY OF THE INVENTION

Accordingly, a major object of the present invention is to provide a switching regulator type power supply circuit in which switching transistor device is operated in a more improved operation state without regard to an input voltage fluctuation applied to input winding of the converter transformer and a fluctuation of a load connected to output winding, so that power loss of switching transistor device is decreased and a more stable operation with less power loss is implemented.

Briefly, the present invention comprises a blocking oscillation device comprising a first switching transistor device having a common electrode, an output electrode and a control electrode, coupled to DC power supply device in series through an input winding of a converter transformer and connected to a positive feedback winding of the converter transformer of the control electrode of the first switching transistor device for performing a blocking oscillating operation.

A positive feedback current control device is coupled to the control electrode of the first switching transistor and the positive feedback winding and is responsive to a voltage generated in the positive feedback winding for applying a positive feedback current which increases as a function of the lapse of time during its on period to the control electrode of the first transistor device.

A switching control device is coupled to a detecting winding of the converter transformer and is responsive to the fluctuation voltage output from the detecting winding and is responsive to the fluctuation of the output voltage of the output winding of the converter transformer coupled to a rectify circuit device for rectifying and smoothing the output voltage for controlling the duration of the on period of the first switching transistor device.

In a preferred embodiment of the present invention, the positive feedback current control device comprises a bias device coupled to the positive feedback winding and is responsive to the voltage generated in the positive feedback winding for providing a bias voltage. A second switching transistor device has a common electrode, an output electrode and a control electrode responsive to the bias voltage. The second switching transistor device is turned on at the same time when the first switching transistor means is turned on. A proportion current supply device applies a positive feedback current increasing approximately in proportion to the lapse of time during the on period of the first switching transistor device to the control electrode of the first switching transistor device.

Since the present invention comprises the converter transformer device, the blocking oscillation device including the first switching transistor device, the positive feedback current control device and the switching control device, the duration of the on period of the first switching transistor device is controlled appropriately by the switching control device at the time of occurrence of a fluctuation of the input voltage applied to the input winding or a fluctuation of the load connected to the output winding through the rectifying circuit device. Also a peak value of the positive feedback current is applied to the first switching transistor device by the positive feedback current control is increased or decreased because the positive feedback current control device provides the positive feedback current increasing as a function of the lapse of time during the on period of the first switching transistor device to the first switching tranistor device. As a result, undesirable power loss of the first switching transistor can be prevented because an operation of the first switching transistor is stabilized and can be put in an operationally efficient state without regard to such fluctuations.

According to the present invention, the operation of the first switching transistor device is more stabilized and can be put in an operationally efficient state, so that undesirable power loss of the first switching transistor device can be reduced. Consequently, an advantage is brought about that a switching regulator type power supply circuit employing a stabilized blocking oscillating operation with less power loss, can be provided.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
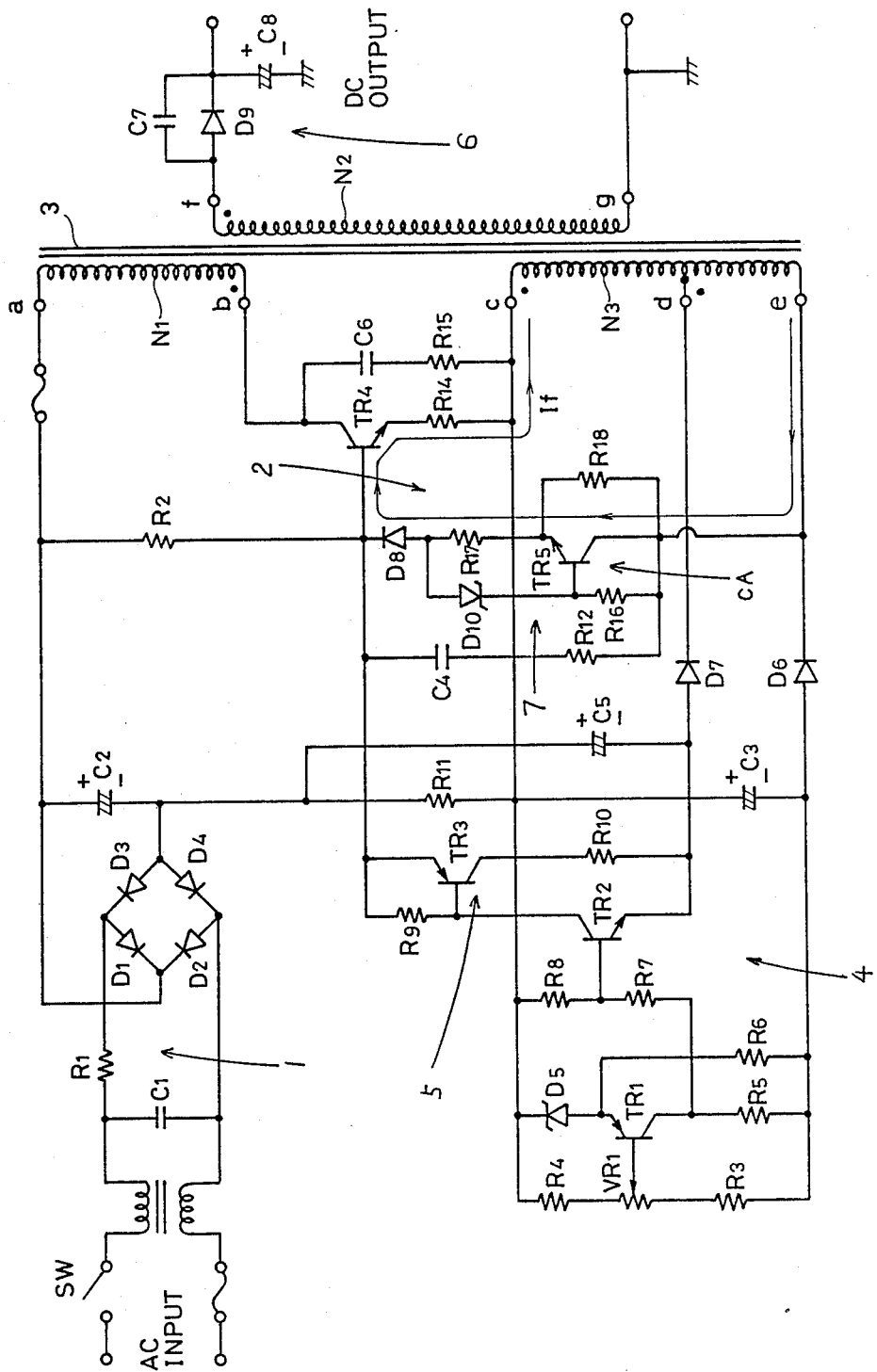
FIG. 1 is a circuit diagram showing one example of a conventional switching regulator type power supply circuit using a blocking oscillating operation.
Figure 2:
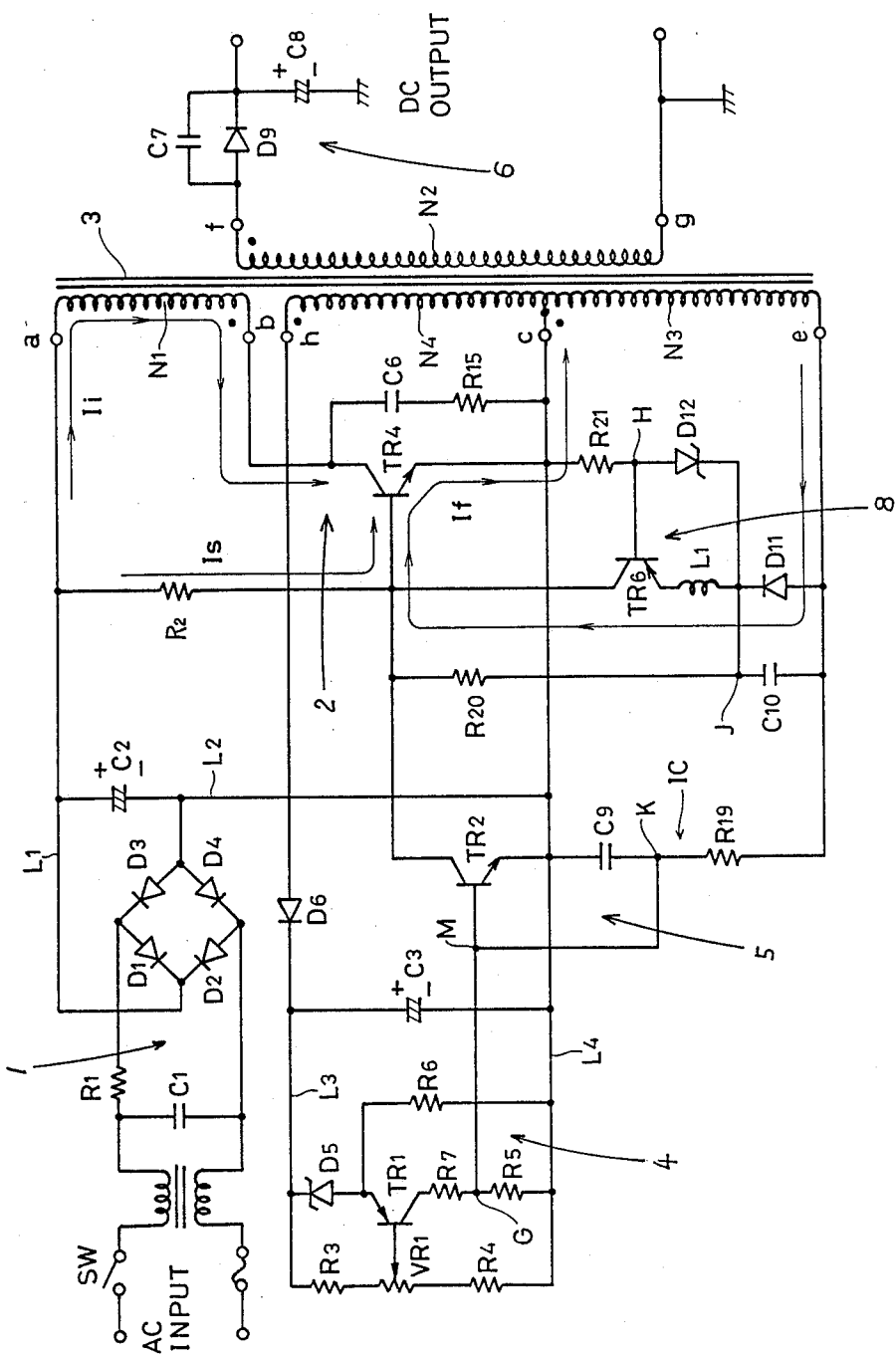
FIG. 2 is a circuit diagram showing one example of a switching regulator type power supply circuit using a blocking oscillation circuit in accordance with the present invention.

FIG. 2 shows one example of a power supply circuit of the present invention, which is described with the same reference characters allotted to those corresponding portions used in FIG. 1.

Referring to FIG. 2, the blocking oscillation portion includes a series connection of the input winding N1 of the converter transformer 3 and the switching transistor TR4 interposed between the output lines L1 and L2 of the input rectifying portion 1 and is connected to a positive feedback current control circuit 8 which is between the feedback winding N3 of the above transformer and the base of the switching transistor TR4.

The fluctuation detecting circuit 4 si also included in the present invention. The circuit 4 detects, by means of a transistor TR1 for detecting a fluctuation and a Zener diode D5, a fluctuation of a DC voltage between lines L3 and L4 a diode D6 and a capacitor C3 are provided for rectifying and smoothing, a voltage generated between both ends h and c of the detecting winding N4 during the off period of the switching transistor TR4.

The control portion 5 includes a resistor R19 and a capacitor C9 connected each to other at a junction K constituting an integrated circuit (IC). The resistor and capacitor are connected between terminals c and e of the feedback winding N3. The control transistor TR2 is connected between the base of the switching transistor TR4 and the terminal c of the feedback winding N3. That is a reference line L4, the junction K and a node point G of an output side of the fluctuation detecting portion 4 is connected to the base of the transistor TR2.

The output rectifying portion 6 rectifies and smooths, with a diode D9 and a capacitor C8, a voltage generated on the output winding N2 of the converter transformer 3 when the switching transistor TR4 is off.

The above mentioned positive feedback current control circuit 8 comprises a diode D11, a capacitor C10 and a resistor R20 connected between the terminal e of the feedback winding N3 and the base of the switching transistor TR4 as shown in FIG. 2, a series connection of an inductor L1 and a PNP type transistor TR6 connected between a junction J and the base of the switching transistor TR4, and a series connection of a Zener diode D12 and a resistor R21 connected to each other at a junction H between the junction J and the terminal c of the feedback winding N3, the junction H being connected to the base of the transistor TR6. The present invention is characterized by the positive feedback current control circuit 8.

Now an operation of the embodiment is described. First, a basic operation of a switching regulator type power supply circuit is described and then an operation of the positive feedback current control circuit 8 is described.

(I) Basic operation of a power supply circuit

At the time of turning on of a power supply switch SW in the input rectifying portion 1, the switching transistor TR4 is triggered and is turned on by a current Is flowing from the line L1 of the input rectifying portion 1 through a starting resistor R2 and the positive feedback current If is supplied from the feedback winding N3 to the base of the above transistor Tr4 through the positive feedback current control circuit 8 after conducting of the switching transistor TR4, so that a blocking oscillation is performed. The switching transistor TR4 is controlled in the manner to be described in the following in a steady state in which such blocking oscillation is performed.

Figure 3:
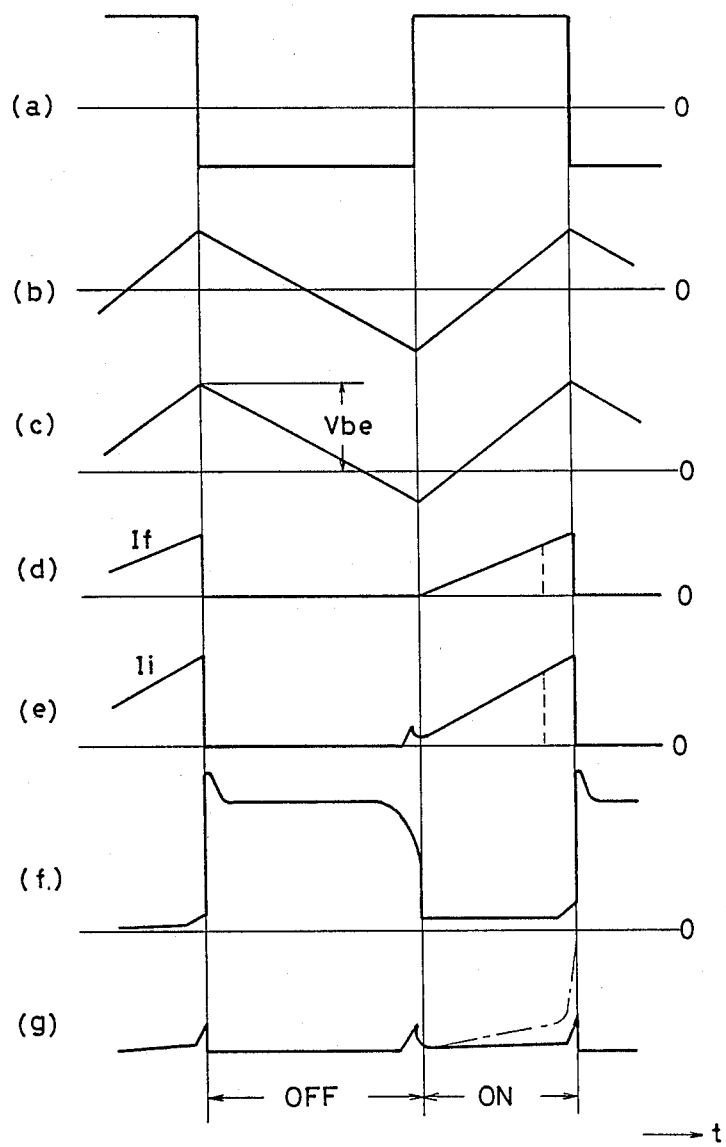
FIG. 3 is a timing chart showing a change of a signal of each portion shown in FIG. 2.

Since a rectangular wave voltage shown in FIG. 3(a) is generated between both ends e and c of the feedback winding N3 in a steady state, the rectangular wave voltage is integrated by the integrating circuit (IC) and a triangular wave voltage shown in FIG. 3 (b) is generated at the junction K. On the other hand, the node point G between resistors R7 and R5 connected between the collector of the fluctuation detecting transistor TR1 and the line L4 is a a positive potential corresponding to the voltage between both ends of a capacitor C3 for getting a detected voltage with respect to the line L4. Then, it follows that a potential on a node point M changes as shown in FIG. 3 (c), because the previous triangular wave voltage on the node point M is superimposed onto the positive potential. Therefore, when the potential of the point M is higher than the reference voltage of the line L3 by more than a threshold voltage Vbe between the base and emitter of the control transistor TR2, the transistor TR2 is turned on. Then, it follows that the positive feedback current If from the feedback winding N3 is bypassed by the control transistor TR2, so that the switching transistor TR4 is turned off. Then, the switching transistor TR4 is returned to an on state by a normal blocking oscillating operation after a predetermined period of time from the turn off.

Thus, the switching transistor TR4 repeats the on and off operation hereafter and, as a result, a voltage generated on the output winding N2 is rectified and smoothed by means of the diode D9 and the capacitor C8 to provide a DC output voltage. When the DC output voltage fluctuates, the DC voltage from the fluctuation detecting winding N4 by means of the diode D6 and the capacitor C3 also changes accordingly and a potential at the point G also changes and, as a result, a turn-off timing of the switching transistor TR4, that is, the length of the on period can be controlled such that the DC output voltage is increased, the length of the on period is decreased corresponding to a potential change of the point G and then the DC output voltage is stabilized.

(II) An operation of the positive feedback current control circuit 8

Meanwhile, since the transistor TR6 in the positive feedback current control circuit 8 is biased by means of the resistor 21 and the Zener diode D12 so as to be turned on by a voltage (FIG. 3(a)) generated between both ends e and c of the feedback winding N3 while the switching transistor TR4 is on, it follows that the current If (FIG. 3(d)) flows into the base of the switching transistor TR4 through that transistor TR6. At that time, that current If is represented by $I_F = 1/L(V_Z - V_{BE}) \cdot t$ in view of $L(dif)/(di) = V_Z - V_{BE}$ and it follows that the If is a function of time t where $V_Z$ is a Zener diode of the Zener diode D12, $V_{BE}$ is a voltage between the base and the emitter of the transistor TR6 and L is an inductance value of the inductor L1. That is, the current If increases linearly as times goes on since $V_Z$ and $V_{BE}$ are constant values. Although the sum of the current If and a current divided into the resistor R20 flows into the base of the switching transistor TR4 as a positive feedback current, the current divided into the resistor R20 is negligible when compared with the current If, because a value of the above resistor R20 is set large enough as compared with the impedance value of the inductor L1.

Therefore, the positive feedback current of the switching transistor TR4 becomes substantially the above mentioned current If and the positive feedback current If is increased during the on period of the switching transistor TR4, as shown in FIG. 3(d). As a result, even if the on period is reduced like a dashed line in FIG. 3(d) due to, for example, an increase of the input voltage or a decrease of the load and a peak value of the collector current Ii (FIG. 3(e)) of the switching transistor TR4 is decreased, the switching transistor TR4 never enter an overdrive state because a peak value of the positive feedback current If is decreased accordingly. Conversely, when the on period of the TR4 is increased due to a decrease of the input voltage or an increase of the load, a peak value of the positive feedback current If is increased in proportion to the on period of the TR4 and, as a result, an underdrive state of the switching transistor TR4 can be prevented. Since the above mentioned positive feedback current If varies with the collector current Ii of the switching transistor TR4, that current If can be set to be in an optimum drive state for the collector circuit Ii at each moment over approximate all period of the on period. In addition, FIG. 3(f) shows a voltage between the collector and the emitter of the switching transistor TR4 and FIG. 3(g) shows a power loss of that transistor TR4, a dashed line showing the conventional one.

The diode D11, capacitor C10 and the resistor R20 in the positive feedback current control circuit 8 become necessitated immediately after the power supply switch SW is turned on. This means that an enough voltage to turn on the Zener diode D12 is not generated on the feedback winding N3 immediately after that turning on and, therefore, a current flowing through the capacitor C10 and the diode D11 is applied to the base of the switching transistor TR4 through the resistor R20 because the transistor TR6 is off.

Figure 4:
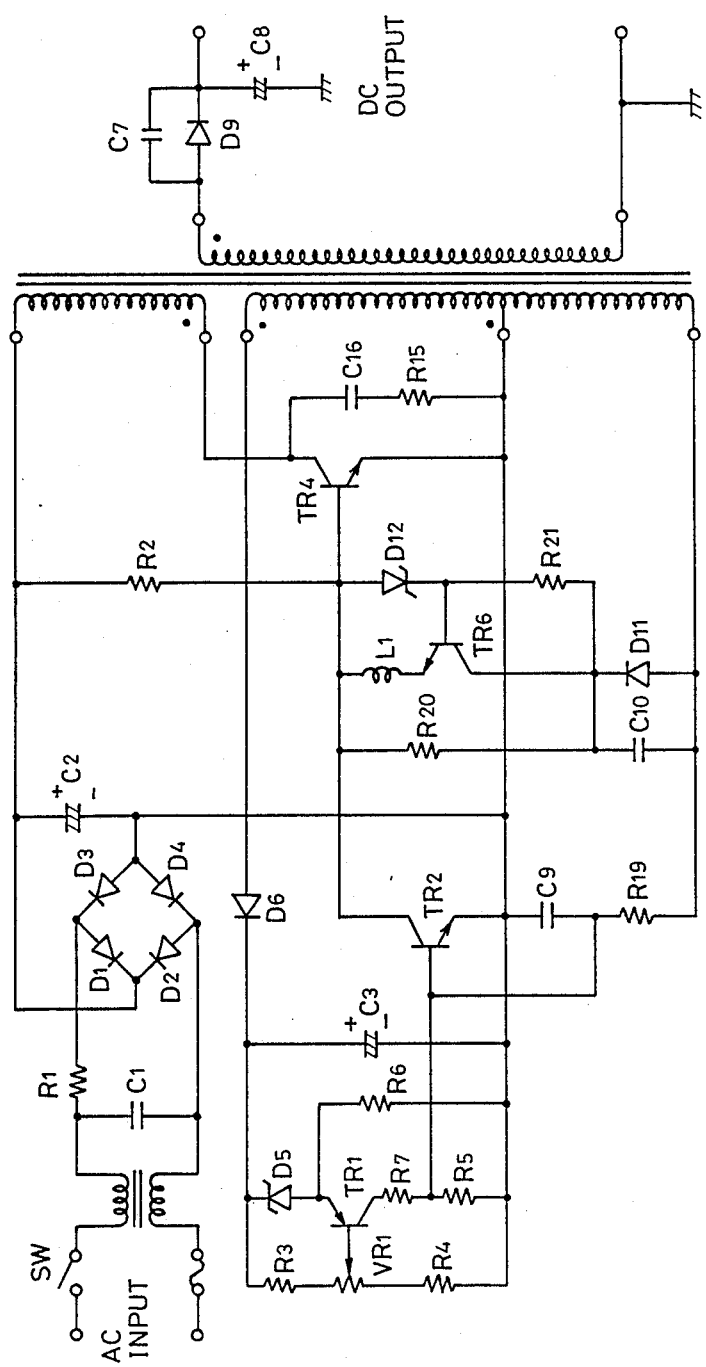
FIG. 4 is a circuit diagram showing another example of a switching regulator type power supply circuit using a blocking oscillation circuit in accordance with the present invention.

FIG. 4 shows another embodiment of the present invention in which the transistor TR6 in the positive feedback current control circuit 8 is of a PNP type. Since an operation is the same as that in FIG. 2, its description is omitted and the same reference characters are allotted to the same or corresponding portions.

The present invention is not limited to the above mentioned embodiment, insofar as the present invention comprises a switching power supply circuit of a blocking oscillation type irrespective of a type of turn-off control for the switching transistor TR4 and, therefore, the present invention is applicable to even a case when a control circuit for turning off comprises the conventional or still other structure.

As described in the foregoing, the present invention comprises the blocking oscillation means including a series connection of the input winding of the converter transformer means and the first switching transistor means connected to the DC power supply means for a blocking oscillating operation; the positive feedback current control means for receiving a voltage generated in the positive feedback winding of the converter transformer means and for applying to the control electrode of the first switching transistor means a positive feedback current increasing as a function of the lapse of time during the on period of the first switching transistor means; and switching control means responsive to a voltage provided from detecting winding for detecting a fluctuation of the output voltage of the output winding of the converter transformer means due to a fluctuation of a load for controlling the length of the on period of the first switching transistor means. As a result, when a fluctuation of the load connected to the output winding through the rectifying circuit means and a fluctuaton of the input voltage applied to the input winding appear, the length of the on period of the first switching transistor is controlled by the switching control means and positive feedback current increasing as a function of the lapse of time during the on period of the first switching transistor means is applied to the control electrode of the first switching transistor means. Therefore, it is possible to perform an operation of the first switching transistor means in a stable and efficient manner with less power loss to fluctuations of the load and the input voltage, and, as a result, a switching regulator type power supply circuit using a stabilized and efficient blocking oscillation is provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A switching regulator type power supply circuit comprising:
    DC power supply means;
    converter transformer means comprising an input winding, a positive feedback winding and an output winding electromagnetically coupled to said input winding, and a detecting winding, electromagnetically coupled to said input winding and said output winding;
    rectifying circuit means, coupled to said output winding, for rectifying and smoothing an output voltage from said output winding;
    blocking oscillation means comprising first switching transistor means having a common electrode, an output electrode and a control electrode, said blocking oscillation means being coupled to said DC power supply means in series through a first terminal of said input winding and connected to said positive feedback winding at the control electrode of said first switching transistor means, said blocking oscillation means for performing a blocking oscillating operation;
    positive feedback current control means coupled to the control electrode of said first switching transistor means and said positive feedback winding, said positive feedback current control means being responsive to a voltage generated in said positive feedback winding, and applying a positive feedback current to the control electrode of said first switching transistor, said positive feedback current increasing as a function of a lapse of time during an on period of said first switching transistor means; and
    switching control means coupled to said detecting winding, said switching control means being responsive to a fluctuation voltage from said detecting winding, being responsive to a fluctuation of the output voltage of said output winding output from said detecting winding and controlling the duration of the on period of said first switching transistor means.

2. A switching regulator type power supply circuit in accordance with claim 1, wherein said positive feedback current control means comprises:
    bias means coupled to said positive feedback winding and responsive to a voltage generated in said positive feedback winding for providing a bias voltage;
    second switching transistor means having a common electrode, an output electrode and a control electrode receiving a bias voltage and being turned on at the time when said first switching transistor means is turned on in response to said bias voltage; and
    proportional current supply means for applying a positive feedback current increasing approximately in proportion to the lapse of time to the control electrode of said first switching transistor means during the on time of said first switching transistor means.

3. A switching regulator type power supply circuit in accordance with claim 2, wherein said positive feedback current control means further comprises:
    trigger current supply means for applying a necessary trigger current for said first switching transistor means to be turned on to said first switching transistor means immediately after said DC power supply means is turned on.

4. A switching regulator type power supply circuit in accordance with claim 1, wherein the output electrode of said first switching transistor means is connected to a second terminal of said input winding which has the first terminal connected to a first terminal of said DC power supply means, and the common electrode of said first switching transistor means is connected to a first terminal of said positive feedback winding and a second terminal of said DC power supply means, said positive feedback winding having a first terminal and a second terminal connected to said positive feedback current control means.

5. A switching regulator type power supply circuit in accordance with claim 2, wherein the common electrode of said second switching transistor means is connected to said proportional current supply means, the control electrode of said second switching transistor means is connected to said bias means, and the output electrode of said second switching transistor means is connected to the control electrode of said first switching transistor means.

6. A switching regulator type power supply circuit in accordance with claim 2, wherein said second switching transistor means comprises a PNP type transistor, the output electrode of said second switching transistor means being connected to the control electrode of said first switching transistor means; said proportional current supply means comprises first inductor means connected to the common electrode of said second switching transistor means and said first inductor means such that a breakdown control electrode of said second switching transistor means and first Zener diode means connected between the current flows in the direction toward the control electrode of said second switching transistor means, said first inductor means being connected so as to receive a current from a second terminal of said positive feedback winding; and said bias means comprises a first resistor means connected between the control electrode of said second switching transistor means and a first terminal of said positive feedback winding.

7. A switching regulator type power supply circuit in accordance with claim 2, wherein said second switching transistor means comprises an NPN type transistor; said porportional current supply means comprises second inductor means connected between the common electrode of said second switching transistor means and the control electrode of said first switching transistor means and second Zener diode means connected between the control electrode of said first switching transistor means and the control electrode of said second switching transistor means such that a breakdown current flows in the direction toward the control electrode of said first switching transistor means; said bias means comprises a second resistor means connected between the control electrode and the output electrode of said second switching transistor means; and the output electrode of said second switching transistor means is connected so as to receive a current from a second terminal of said positive feedback winding means.

8. A switching regulator type power supply circuit in accordance with claim 3, wherein said trigger current supply means comprises third resistor means connected between a first terminal of said DC power supply means and the control electrode of said first switching transistor means.

9. A switching regulator type power supply circuit in accordance with claim 3, wherein said trigger current supply means comprises a series connection of a fourth resistor means and a parallel connection of a capacitance means and a diode means, connected between the control electrode of said first switching transistor means and a second terminal of said positive feedback winding so as to allow a current to flow from the second terminal of said positive feedback winding to the control electrode of said first switching transistor means, the diode means being connected in such direction that a current is applied from said positive feedback winding to the control electrode of said first switching transistor means.

10. A switching regulator type power supply circuit in accordance with claim 1, wherein said switching control means comprises:
  integrating circuit means coupled to said positive feedback winding for integrating a voltage generated in said positive feedback winding and for outputting said integrated voltage;
  fluctuation voltage output circuit means coupled to said detecting winding for converting a voltage generated in said detecting winding to a fluctuation voltage of an appropriate DC voltage value; and
  third switching transistor means coupled to said integrating circuit means and said fluctuation voltage output circuit means and responsive to a sum voltage of the integrated voltage and the DC fluctuation voltage for being turned on for turning said first switching transistor means off.

* * * * *